United States Patent [19]

Schondelmyer

[11] 3,734,291

[45] May 22, 1973

[54] WASTE TREATMENT SYSTEM

[75] Inventor: Scott M. Schondelmyer, Dayton, Ohio

[73] Assignee: Dayton Manufacturing Company, Dayton, Ohio

[22] Filed: Apr. 29, 1971

[21] Appl. No.: 138,430

[52] U.S. Cl............................210/152, 4/10, 4/115, 137/268, 210/62, 210/206, 210/484
[51] Int. Cl................................................C02c 5/02
[58] Field of Search.......................210/62, 152, 198, 210/206, 484; 4/10, 115; 137/268

[56] References Cited

UNITED STATES PATENTS

| | | | |
|---|---|---|---|
| 2,858,939 | 11/1958 | Corliss | 210/152 X |
| 3,579,440 | 5/1971 | Bradley | 210/62 X |
| 3,474,817 | 10/1969 | Bates et al. | 137/268 |
| 3,510,000 | 5/1970 | Carlson | 210/152 |

Primary Examiner—Michael Rogers
Attorney—Marechal, Biebel, French & Bugg

[57] ABSTRACT

A self-contained waste treatment system includes a bowl for receiving liquid and solid wastes and a macerator associated with the bowl for macerating the solid wastes and pumping the resulting mixture of liquids and divided solids to a receiving tank. An upstanding, tubular filter is mounted in the receiving tank and surrounds an opening in a bottom wall of the tank. Within the tubular filter a tubular magazine is positioned having a closed upper end, an open lower end and a series of openings through a lower section of its side wall. The magazine is also provided with a nipple at its lower end which is received in an outlet from the receiving tank and a filter pad is received in the magazine and lies across its open lower end. A stack of chemical additive tablets, such as calcium hypochlorite, are received in the magazine with the lower most tablet resting upon the filter pad. With this construction the mixture of liquid and solid wastes pumped to the receiving tank are separated by the tubular filter with the solids being retained in the receiving tank and the liquids passing through the filter to the tubular magazine. As the liquids enter the magazine through the opening in the lower end thereof pressure in the magazine builds up, preventing the magazine from being flooded. The chemical additive tablets in the magazine therefore, are dissolved sequentially from the bottom of the stack as the liquid passes through the filter and out the discharge opening in the receiving tank.

1 Claim, 4 Drawing Figures

Patented May 22, 1973

INVENTOR
SCOTT M. SCHONDELMYER

BY
Marechal, Biebel, French & Bugg
ATTORNEYS

Patented May 22, 1973
3,734,291
2 Sheets-Sheet 2
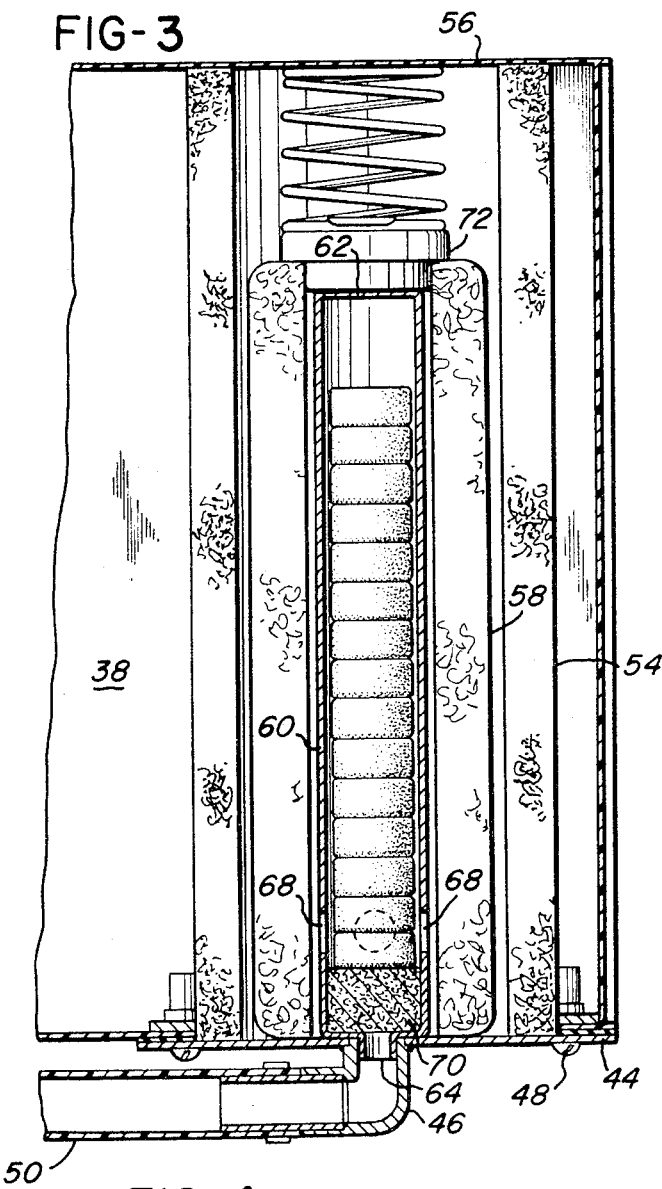
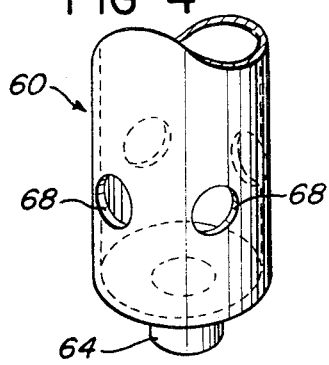

WASTE TREATMENT SYSTEM

BACKGROUND OF THE INVENTION

While conventional municipal sewage treatment systems or septic systems function efficiently to treat liquid and solid wastes such as sewage, an entirely different approach is necessary for the efficient treatment of wastes in mobile environments such as trains, boats, airplanes, etc. Thus, while sewage treatment plants of the type shown, for example, in the U.S. Pat. to Koulovatos, No. 3,487,937, provide a method of treating sewage through sedimentation, aeration, ultraviolet radiation, and chlorination, a system of this type would generally be considered too large to be of practical benefit in environments such as planes, trains, ships, etc.

Another approach to the treatment of sewage which utilizes a more compact treating unit is that shown in the U.S. Pat. to Carlson, No. 3,451,552. In the unit disclosed in this patent sewage is fed into a macerator which chops the solid particles to a smaller size and then pumps the mixture of liquids and solid sewage through a bed of tablets of soluble calcium hypochlorite. The passage of the sewage through the bed of tablets will cause a dissolving of some of the tablets to, in effect, chlorinate the sewage, and the subsequent passage of the sewage and a portion of the dissolved tablets through the various chambers of the unit will cause the sewage and the dissolved chlorine to become intermixed before this mixture is discharged overboard.

While systems of this general type function in environments where much larger systems are of no practical use, it will be appreciated that the bed of sodium hypochlorite tablets are subject to clogging by the solid particles carried therethrough. Additionally, the discharge of solid waste material, while possibly permissible in a marine environment, would usually be considered objectionable in, for example, a train, where the waste would be dumped on the right of way of the railroad track.

SUMMARY OF THE INVENTION

The present invention provides a self-contained waste treatment system in which the liquid and solid wastes are received in a bowl and transferred to a macerator-pump, which then macerates the solid wastes and pumps the resulting mixture of liquid and solid wastes and usually, a flushing liquid, to a receiving tank. The receiving tank contains an upstanding tubular filter which separates the solid wastes from the liquid wastes and a tubular magazine positioned within the tubular filter contains a stack of calcium hypochlorite tablets or the like which are sequentially dissolved by the passage of the filtered liquid through the filter and the perforated wall of the magazine.

The filtered liquid, therefore, is chemically treated before being discharged through a discharge opening formed in the bottom wall of the receiving tank in communication with the interior of the tubular magazine. In addition to the chemical treatment of the liquid the resulting aeration of the liquid as it is discharged from the receiving tank into the atmosphere, as would be the case in a train, airplane, or the like, provides a further treatment of the liquid waste material.

Thus, the waste treatment system of the present invention is compact and readily adapted for use in mobile environments. At the same time, there is little danger of the chemical additive being clogged with particles of solid waste materials. Additionally, because only the lowermost tablet, or are at the most, the lowermost portion of the stack of tablets, is in contact with the liquid material, the life of the chemical additive supply is greatly lengthened in comparison with a system in which the entire supply of chemical additives is immersed in the material being treated.

Also, it will be noted that in environments where it would be objectionable, if not prohibited, to dump solid waste from the system, as in railroad cars, the present system functions admirably since the solids are retained within the system for removal during periodic servicing and maintenance. Since the portion of liquid wastes in combined liquid and solid wastes is many times that of the portion of solid wastes and since the liquid wastes are continuously discharged from the system upon treatment, the present system, while retaining the solids therewithin, may still be operated for appreciable periods of time without servicing.

BRIEF DESCRIPTION OF THE DRAWINGS

FIG. 3 is an elevational view, partly in cross section, showing a portion of the receiving tank of the present invention and the filter and magazine associated therewith; and FIG. 4 is a perspective view of a portion of the lower end of the magazines.

DESCRIPTION OF THE PREFERRED EMBODIMENTS

Figure 1:
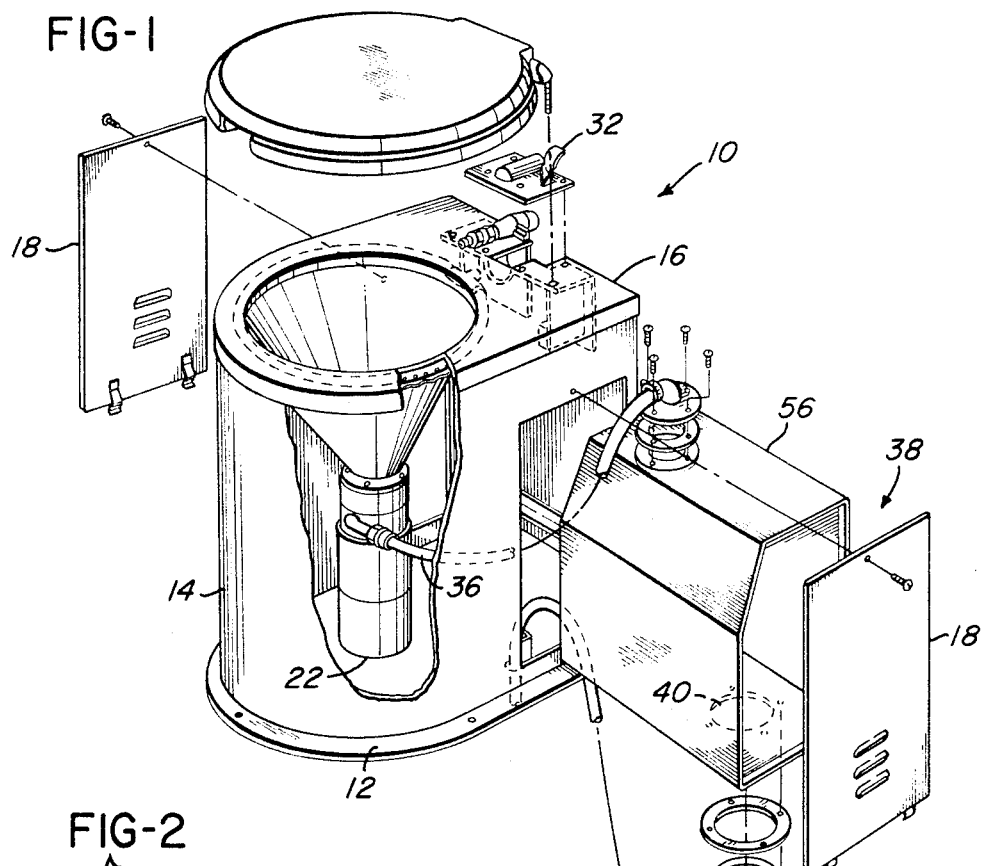
FIG. 1 is an exploded perspective view of a waste treatment system in accordance with the present invention.
Figure 2:
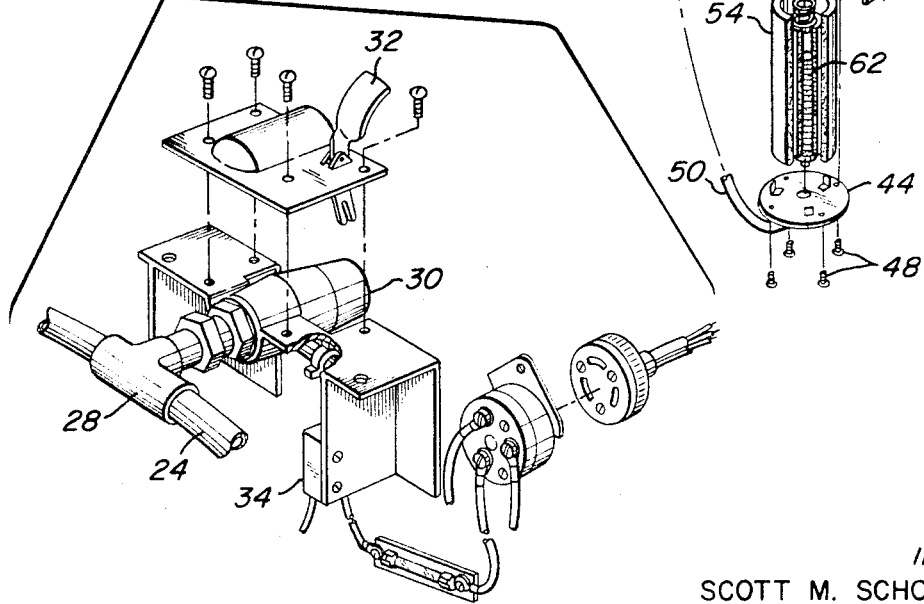
FIG. 2 is a second exploded perspective view of a portion of the system of FIG. 1.

As seen in FIG. 1 of the drawings, the waste treatment system 10 of the present invention may comprise a supporting framework, as at 12, and a housing having an upstanding wall portion 14, a top cover 16 and oppositely disposed access plates 18. Mounted in the cover 16 is a bowl 20, which tapers downwardly from its upper end toward a macerator-pump 22 positioned within the casing 14. A flushing ring 24 having a series of perforations 26 formed therethrough is positioned beneath the cover 16 about the upper end of the bowl 20 and communicates, by means of a T-section 28, with a valve 30.

Operation of the valve 30 is controlled by the lever 32, which also serves to actuate a switch 34 to simultaneously control operation of the macerator-pump 22. Thus, actuating the handle 32 will simultaneously cause flushing liquid to be admitted from any suitable source through valve 30 and into the flushing ring 20 to flush liquid and solid wastes deposited in the bowl 20 into the macerator-pump 22 and also to actuate the macerator-pump 22 to reduce the solid wastes and pump the mixture of solid wastes, liquid wastes, and flushing liquid through the line 36 to the receiving tank 38. Any suitable macerator-pump may be utilized, such as a macerator of the same general type as that disclosed in the above noted patent to Carlson but with the flow therethrough reversed from that shown in FIG. 1 of the Carlson patent.

The receiving tank 38, as best seen in FIG. 1 of the drawings, has opening 40 formed in the bottom wall 42 thereof. A cover plate 44, having an elbow 46 attached thereto, is secured in place over the opening 40 by means of screws or the like 48 and a discharge line 50 is attached to the elbow 46 for discharging wastes from the sewage treatment system.

A series of prongs 52 extend upwardly from the plate 44 to receive a relatively coarse, outer, tubular filter 54 extending from the plate member 44 to the top wall 56 of the receiving chamber 38. Positioned within the outer tubular filter 54 in spaced, concentric relationship thereto is an inner tubular filter 58, and mounted within the inner tubular filter 58 in spaced concentric relationship thereto is a tubular magazine 60. The tubular magazine 60 has a closed upper end 62 and an open lower end terminating in a nipple 64 received in the elbow 46. Magazine 60, as best seen in FIG. 5, is also provided with a series of spaced openings 68, four being shown, adjacent its lower end and, as seen in FIG. 4, a filter pad 70 is positioned in the magazine.

A stack of chemical additive tablets, such as calcium hypochlorite, are positioned within the tubular magazine 60 and rest upon the filter pad 70 extending across the open lower end of the magazine. A plug 72 is received on the upper end of the tubular filter 58 and is retained in position by means of a coil spring 74 extending between the plug 72 and the top wall 56 of the receiving tank 38. Track means, one of which is shown at 76 in FIG. 1 of the drawings, are mounted within the housing 14 to facilitate sliding the receiving tank 38 into and out of the housing for servicing.

With the above construction it will be seen that the mixture of liquid and solid wastes deposited in the receiving tank are filtered, with the solids being retained in the tank and liquids passing through the coarse, outer filter 54 and the finer, inner filter 58. As the liquids enter the magazine 60 through the openings 68 in the lower end thereof pressure within the magazine builds up, preventing the liquid level therein from rising and flooding the entire magazine. Instead, only the filter pad 70 and the lowermost or lowermost few tablets are moistened rather than the entire stack of tablets.

The tablets, therefore, are dissolved sequentially from the bottom of the stack to provide a controlled release of chlorine to treat the liquid waste material on a demand basis before it is discharged from the system. Of course, as noted above, the liquid receives an additional treatment where the system is used in such installations as railroad cars since the liquid passing from the system will tend to be aerated in the process of discharge.

In any event, it will be seen that the present invention provides an extremely compact self-contained unit which prevents the dumping of unsightly solid waste materials and instead discharges only chemically treated liquid wastes from the system. It will, therefore, lengthen the intervals between servicing of the system. It will also be noted that the life of the chemical additive is appreciably lengthened since the tablets are not all or continuously immersed in the material being treated, but only the lowermost tablet or lowermost portion of the stack of tablets is in contact with the waste materials and then, usually, only when the system is actually being used.

The present system is, therefore, ideally suited for use in mobile environments where space is at a premium and efficient, relatively low maintenance systems with relatively long servicing intervals are desired. While the invention has been described in the context of the unit in which the receiving tank is mounted within a casing which also mounts the other units of the system, it will be appreciated that the receiving tank could be separated from the bowl and macerator and that a single receiving tank could service more than one bowl and macerator unit.

While the forms of apparatus herein described constitute preferred embodiments of the invention, it is to be understood that the invention is not limited to these precise forms of apparatus, and that changes may be made therein without departing from the scope of the invention.

What is claimed is:
1. A waste treatment system comprising:
  a. a supporting framework and housing,
  b. a waste receiving bowl mounted on said housing,
  c. a flush ring mounted adjacent the upper end of said bowl,
  d. means for admitting a flushing liquid to said flush ring,
  e. a waste receiving tank,
  f. track members mounted on said housing for slidably receiving said tank within said housing,
  g. a macerator mounted on the lower end of said bowl for receiving liquid and solid wastes and flushing liquid from said bowl, macerating said solid wastes and pumping a mixture of said wastes and flushing liquid to said receiving tank,
  h. an upstanding, outer tubular filter,
  i. means mounting said outer filter on a bottom wall of said receiving tank,
  j. an upstanding, inner tubular filter received in said outer filter in concentric relationship thereto,
  k. a tubular magazine received in said inner filter and having a closed upper end, an open lower end terminating in a nipple and a series of openings formed through the wall of said magazine adjacent its lower end,
  l. a plug seated in an upper end of said inner filter,
  m. a coil spring engaging said plug for maintaining said plug in said filter,
  n. means defining an opening through said bottom wall of said tank receiving said nipple therein,
  o. a filter pad positioned in said tubular magazine and spanning said open end thereof, and
  p. a stack of tablets of calcium hypochlorite positioned in said magazine with the lowermost tablet in said stack resting on said pad to permit said tablets to be dissolved sequentially by filtered liquid passing through said filters.

* * * * *